US008718566B2

(12) United States Patent
Prather (10) Patent No.: US 8,718,566 B2
(45) Date of Patent: *May 6, 2014

(54) ASSESSING INTERFERENCE ENVIRONMENT FOR WIRELESS COMMUNICATION DEVICES

(75) Inventor: Scott D. Prather, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,016

(22) Filed: Aug. 21, 2012

(65) Prior Publication Data

US 2012/0315860 A1 Dec. 13, 2012

Related U.S. Application Data

(63) Continuation of application No. 12/819,045, filed on Jun. 18, 2010, now Pat. No. 8,249,512.

(51) Int. Cl.
*H04B 1/00* (2006.01)
*H04B 15/00* (2006.01)

(52) U.S. Cl.
USPC .......... 455/63.1; 455/67.11; 455/67.13; 455/67.15; 455/68; 455/69; 455/226.1; 455/226.2; 455/226.3; 455/296; 375/346; 375/349

(58) Field of Classification Search
USPC ........ 455/63.1, 67.11, 67.13, 67.15, 455/226.1–226.3, 296, 68–69; 375/254, 375/346–351
See application file for complete search history.

(56) References Cited

U.S. PATENT DOCUMENTS

| 5,606,729 | A | * | 2/1997 | D'Amico et al. | 455/67.11 |
|---|---|---|---|---|---|
| 5,613,218 | A | * | 3/1997 | Li et al. | 455/71 |
| 5,861,753 | A | | 1/1999 | Carbonini | |
| 6,104,909 | A | | 8/2000 | Baldwin | |
| 6,131,013 | A | * | 10/2000 | Bergstrom et al. | 455/63.1 |
| 6,571,089 | B1 | * | 5/2003 | Richards et al. | 455/266 |
| 6,741,857 | B1 | | 5/2004 | Warden | |
| 6,766,142 | B2 | * | 7/2004 | King | 455/63.1 |
| 6,795,030 | B2 | | 9/2004 | Klingler | |
| 6,834,380 | B2 | | 12/2004 | Khazei | |
| 7,058,144 | B2 | * | 6/2006 | Baldwin | 375/346 |

(Continued)

FOREIGN PATENT DOCUMENTS

JP 2001-155048 6/2001
WO WO 2008/118932 10/2008

OTHER PUBLICATIONS

U.S. Office Action dated Dec. 23, 2011 in U.S. Appl. No. 12/819,045.

(Continued)

*Primary Examiner* — Tuan A Tran
(74) *Attorney, Agent, or Firm* — Hartman & Citrin LLC (57) ABSTRACT

Disclosed is a device and method to automate the process of measuring RF noise, correlating measured noise with known sources, and making adjustments to the noise-measuring and reporting process. A wireless communication device is coupled to equipment at a fixed location, and transmits data about the operation of the equipment back to an operator, via a provider's network. Examples include fixed wireless terminals. A management entity aboard the wireless communication device performs the measurements via a transceiver, and performs remedial actions when required, without requiring an onsite technician or remote assistance. The management entity may include a spectrum analyzer.

20 Claims, 6 Drawing Sheets

(56) References Cited

U.S. PATENT DOCUMENTS

| | | |
|---|---|---|
| 7,706,485 B2 | 4/2010 | Lu |
| 7,941,135 B2 * | 5/2011 | Abusch-Magder ............ 455/423 |
| 8,155,639 B2 | 4/2012 | Prather |
| 2006/0194553 A1 | 8/2006 | Ozaki et al. |
| 2007/0264940 A1 * | 11/2007 | Ho et al. .................... 455/67.13 |
| 2008/0084218 A1 | 4/2008 | Hailey et al. |
| 2008/0106381 A1 | 5/2008 | Adamec |
| 2010/0120382 A1 | 5/2010 | Prather |
| 2010/0151870 A1 | 6/2010 | Piercy |

OTHER PUBLICATIONS

U.S. Notice of Allowance dated Apr. 12, 2012 in U.S. Appl. No. 12/819,045.

U.S. Notice of Allowance dated Nov. 23, 2011 in U.S. Appl. No. 12/052,521.

International Search Report and Written Opinion dated Sep. 29, 2008 in International Application No. PCT/US2008/058192.

* cited by examiner

ASSESSING INTERFERENCE ENVIRONMENT FOR WIRELESS COMMUNICATION DEVICES

This application is a continuation of U.S. patent application Ser. No. 12/819,045, filed Jun. 18, 2010, now U.S. Pat. No. 8,249,512, the content of which is incorporated by reference herein in its entirety into this disclosure.

BACKGROUND OF THE INVENTION

1. Field of the Invention

The present invention relates to wireless communication devices. More specifically, the present invention relates to measuring interference in the radiofrequency (RF) environment of wireless communication devices.

2. Background of the Invention

Wireless communication devices are proliferating across the market. The increasing ubiquity of cellular telephones has manufacturers scrambling to provide faster, more efficient, and larger wireless networks. Further, the fusion of IP and cellular technology is allowing more and more people, businesses, and industries to use these wireless networks for all sorts of purposes.

This has led to wireless networks being used for non-mobile purposes. For instance, fixed wireless terminals are being installed or embedded in a variety of equipment for a variety of purposes. Vending machines use wireless technology to transmit stock updates to the local distributors. Traffic signals and cameras use wireless networks to transmit statistics as well as violations of the law to law-enforcement agencies. This emerging field of reporting updates wirelessly is known as telemetry.

Unfortunately, the increasing concentration of wireless radio waves in the environment results in such fixed terminals being susceptible to noise and interference. Either the signal strength of the provider's network is not strong enough, or another third-party network's signal is generating strong interference. Sometimes even proximally placed electronic objects such as televisions and microwave ovens result in unacceptable levels of noise, resulting in a communication breakdown between the embedded wireless device in the equipment, and the provider's network.

Diagnosing these issues has its own problems. Since the wireless transceivers embedded in this equipment is not meant to be operated by humans, it is generally transparent to a user (i.e., hidden away somewhere). At present, the only ways to diagnose these problems is to measure the noise in the RF environment around the equipment. This is done by sending an engineer or technician to the site itself, and performing spectrum analyzing measurements locally. This is expensive, time-consuming and does not always solve the problem. Especially when connection issues are intermittent, it is not always convenient to send a technician to a site at the right time when the connection will break. This results in frequent misdiagnoses. Even if measurements are made by a spectrum analyzer incorporated within the equipment, the stored measurements have to be accessed locally, especially when connection issues are presently prevalent.

What is needed is a way to automate the process of measuring and reporting noise and interference in an RF field around a wireless communication device.

SUMMARY OF THE INVENTION

The present invention addresses the above-identified problems in the conventional art by automating the process of measuring noise, correlating measured noise with known sources, and making adjustments to the noise-measuring and reporting process. A management entity aboard the wireless communication device performs the measurements via a transceiver, and performs remedial actions when required, without requiring an onsite technician or remote assistance.

In one exemplary embodiment, the present invention is a noise-measuring device, including a processor; a transceiver in communication with the processor; a memory in communication with the processor; and a management logic on the memory. The management logic enables the noise-measuring device to measure an ambient signature of a radio-frequency (RF) environment of the device, store the ambient signature, measure a noise signature of an RF band, compare the noise signature with the ambient signature, determine that a threshold is exceeded, and perform a remedial action.

In another exemplary embodiment, the present invention is a method for measuring noise in a radio-frequency (RF) environment of a device having a transceiver. The method includes measuring an ambient signature of an RF environment of the device, the ambient signature including an interference signature for a known third-party network; storing the ambient signature; measuring a noise signature of an RF band in the RF environment; comparing the noise signature with the ambient signature; determining that a threshold is exceeded, the threshold including at least one of a signal strength of a provider's network, an error rate, an interference level, and an interference mask; and performing a remedial action.

In another exemplary embodiment, the present invention is a computer program product stored on a memory of a device having a processor and a transceiver. The computer program product includes computer-executable instructions for measuring an ambient signature of a radio-frequency (RF) environment of the device, the ambient signature including an interference signature for a known third-party network; storing the ambient signature; measuring a noise signature of an RF band in the RF environment; comparing the noise signature with the ambient signature; determining that a threshold is exceeded, the threshold including at least one of a signal strength of a provider's network, an error rate, an interference level, and an interference mask; and performing a remedial action.

DETAILED DESCRIPTION OF THE INVENTION

The present invention addresses the above-identified problems by automating the process of measuring noise, correlating measured noise with known sources, and making adjustments to the noise-measuring and reporting process. A wireless communication device is coupled to any device, machine, or instrument, and transmits data about the operation of the device, machine, or instrument back to an operator, via a provider's network. Examples include fixed wireless terminals. A management entity aboard the wireless communication device performs the measurements via a transceiver, and performs remedial actions when required, without requiring an onsite technician or remote assistance. The management entity may include a spectrum analyzer.

The measurements include an ambient radio frequency (RF) environment using signals received from an antenna coupled to the transceiver itself. This measurement is stored as an ambient signature. Subsequently, at a pre-programmed interval, the management entity automatically disconnects the transceiver from the provider's network, measures a noise signature in the RF environment around the antenna, and processes the noise signature measurement to determine if a remedial action needs to be taken. The noise signature measurement can be taken for multiple frequencies, bands of frequencies, or specific frequencies within a band. The noise signature measurement is correlated with the stored ambient signature. If a pre-programmed threshold, such as noise level or signal strength, is crossed, then a plurality of remedial actions may be taken, from adjusting a frequency of measurement of noise, to adjusting a trigger for noise measurement, to performing a different type of noise measurement (for instance on a different frequency band), to reporting the noise measurement and/or generating an alarm. The report and/or alarm are transmitted to an operator of the device/machine/instrument after the measurement is complete and the transceiver is re-connected to the provider's network.

"Wireless communication device", as used herein and throughout this disclosure, refers to any electronic device capable of wirelessly sending and receiving data. A wireless communication device may have a processor, a memory, a transceiver, an input, and an output. The memory stores applications, software, or logic. Examples of processors are computer processors (processing units), microprocessors, digital signal processors, controllers and microcontrollers, etc. Examples of device memories that may comprise logic include RAM (random access memory), flash memories, ROMS (read-only memories), EPROMS (erasable programmable read-only memories), and EEPROMS (electrically erasable programmable read-only memories).

"Logic" as used herein and throughout this disclosure, refers to any information having the form of instruction signals and/or data that may be applied to direct the operation of a processor. Logic may be formed from signals stored in a device memory. Software is one example of such logic. Logic may also be comprised by digital and/or analog hardware circuits, for example, hardware circuits comprising logical AND, OR, XOR, NAND, NOR, and other logical operations. Logic may be formed from combinations of software and hardware. On a network, logic may be programmed on a server, or a complex of servers. A particular logic unit is not limited to a single logical location on the network.

A wireless communication device also includes a transceiver to connect to a network. One example of a network interface is a Subscriber Identity Module (SIM) card. A "network" can include broadband wide-area networks, local-area networks, and personal area networks. Communication across a network is preferably packet-based; however, radio and frequency/amplitude modulations networks can enable communication between communication devices using appropriate analog-digital-analog converters and other elements. Examples of radio networks include Wi-Fi and Bluetooth® networks. Wireless communication devices may have more than one transceiver, capable of communicating over different networks, for instance, a GPRS transceiver for communicating with a cellular base station, a Wi-Fi transceiver for communicating with a Wi-Fi network, and a Bluetooth® transceiver for communicating with a Bluetooth® device. A network typically includes a plurality of elements that host logic for performing tasks on the network.

A wireless communication device can be coupled to or incorporated within a larger apparatus for communicating updates or diagnostics about the apparatus to an operator or owner of the apparatus. Several examples of this type of telemetry are conceivable in the fields of stock management, security and defense, agriculture, medicine, etc. For instance, a vending machine is able to transmit stock updates to a vendor via the wireless communication device. A road-side enforcement unit that monitors traffic and/or takes photos of speeders can upload the data to a law enforcement agency. A security system having a plurality of sensors dispersed around an area can report temperature, carbon monoxide, or break-in alerts to a central monitoring station. Other examples will become apparent in light of this disclosure.

For the following description, it can be assumed that most correspondingly labeled structures across the figures (e.g., 132, 232 and 332, etc.) possess the same characteristics and are subject to the same structure and function. If there is a difference between correspondingly labeled elements that is not pointed out, and this difference results in a non-corresponding structure or function of an element for a particular embodiment, then that conflicting description given for that particular embodiment shall govern.

Figure 1:
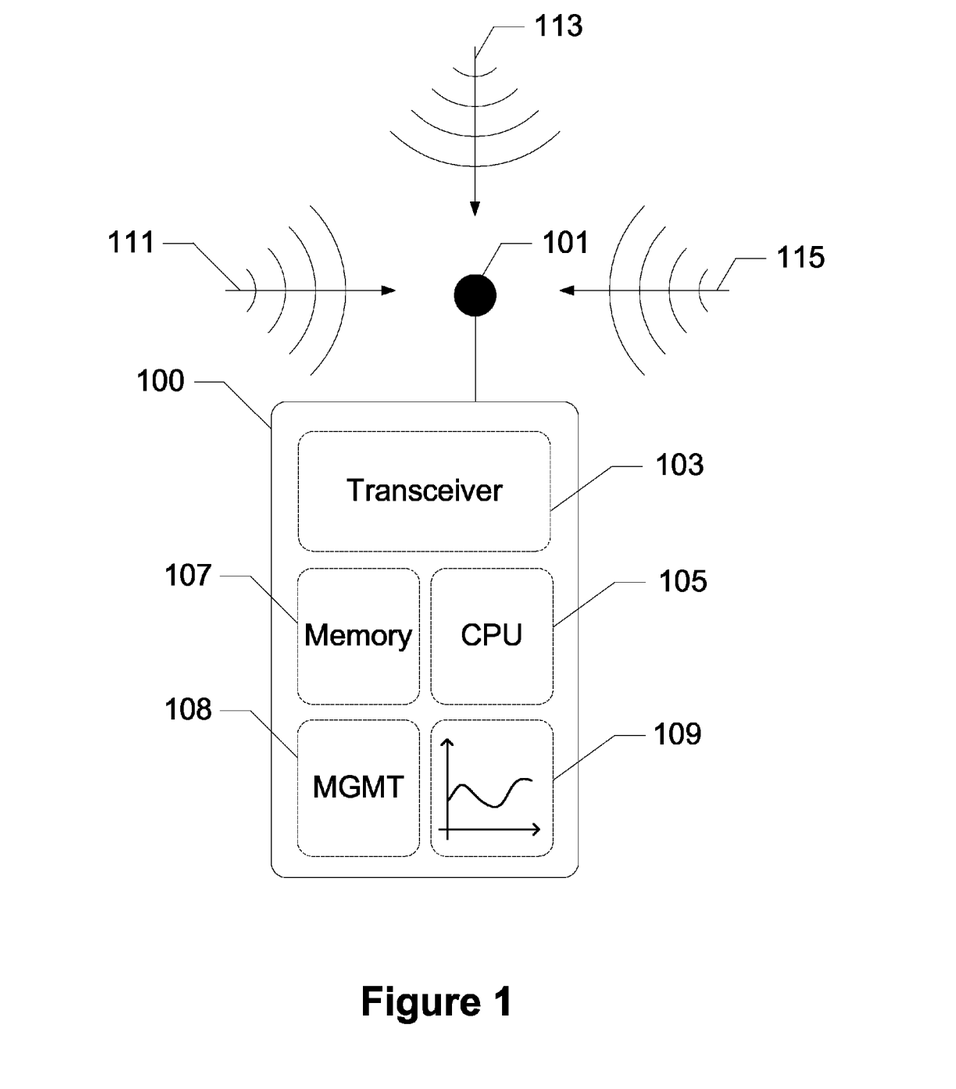
FIG. 1 shows a wireless communication device for measuring noise, according to an exemplary embodiment of the present invention.

FIG. 1 shows a wireless communication device for measuring noise, according to an exemplary embodiment of the present invention. Device 100 includes an antenna 101, a transceiver 103, a Central Processing Unit (CPU) 105, a memory 107, management logic 108 and spectrometer 109. Other components are possible but not displayed, such as a power supply, additional logic to perform telemetry tasks, as well as additional components related to the machine/instrument that device 100 is a part of.

Antenna 101 converts radio frequency (RF) waves into electrical signals, and transmits the signals to transceiver 103. Antenna 101 can be tuned by transceiver 103 to receive a particular frequency or band of frequencies, such as provider's signal 111. If appropriately tuned, antenna 101 can also tune into third-party signal 113 or other signal 115. Antenna 101 can also be used by transceiver 103 to transmit RF signals. Transceiver 103 is designed to operate in a particular band of frequencies (RF band), such as GPRS, Bluetooth®, WiMax, etc. In this case, transceiver 103 is tuned to receive from and transmit to provider's network 111. The instructions of what data to transmit, and how to process received data, are stored in logic in memory 107, and performed by CPU 105. Instructions to perform diagnostic measurements such as ambient signature measurements and RF noise measurements are stored in management logic 108. Spectrum analyzer 109 is a virtual spectrum analyzer (software based), or any conventional spectrum analyzer coupled to device 100, such as an Agilent PSA spectrum analyzer or others with equivalent performance characteristics. Operation of management logic 108 and spectrum analyzer 109 may be controlled via a user interface accessible on a display that is in communication with device 100 either directly or remotely across provider's network, as described later with respect to FIG. 6.

During normal operation, device 100 is registered with provider's signal 111, and periodically or continuously transmits and receives data across the provider's network. However, the addition of signals 113 and 115 can cause interference and noise as described above. Further, this can deteriorate the strength of provider's signal 111. Consequently, management logic 108 contains instructions to disconnect or de-register device 100 from the provider's network, and perform a noise signature measurement. During this process, all signals in the RF environment of antenna 101 are measured, and their effects on the provider's signal 111 are computed by spectrum analyzer 109. The collective effects are termed a noise signature. The concept of a noise signature, and how it is measured, are described in U.S. Patent Publication 2009/0066343, which is assigned to the assignee of the present application, and which the contents thereof are hereby incorporated in their entirety. Briefly, each RF signal, 113 and 115, potentially contributes to the noise induced in antenna 101, and each RF signal displays its own unique "signature", where signals within the RF band of provider's signal 111 can vary according to the contribution. The noise signature measurement is stored on memory 107.

Furthermore, an ambient signature measurement may be performed when device 100 is first installed in its location. The ambient signature measurement includes a measurement of the provider's signal 111, as well as other RF signals in the RF environment while device 100 is in a fully operational state, and is stored on memory 107. Management logic 108 and spectrum analyzer 109 perform subsequent noise signature measurements and compare them to the ambient signature measurement. Any thresholds defined in the ambient signature measurement, or in another set of rules stored on memory 107, provide a benchmark of minimum performance. If these thresholds are crossed, management logic 108 undertakes remedial actions, such as adjusting a frequency of noise signature measurement, a type of noise signature measurement, reporting the noise signature at the particular time, or generating an alarm. Adjusting the type of noise signature measurement includes varying the RF band for performing the measurement, focusing on a particular frequency, etc.

Figure 2:
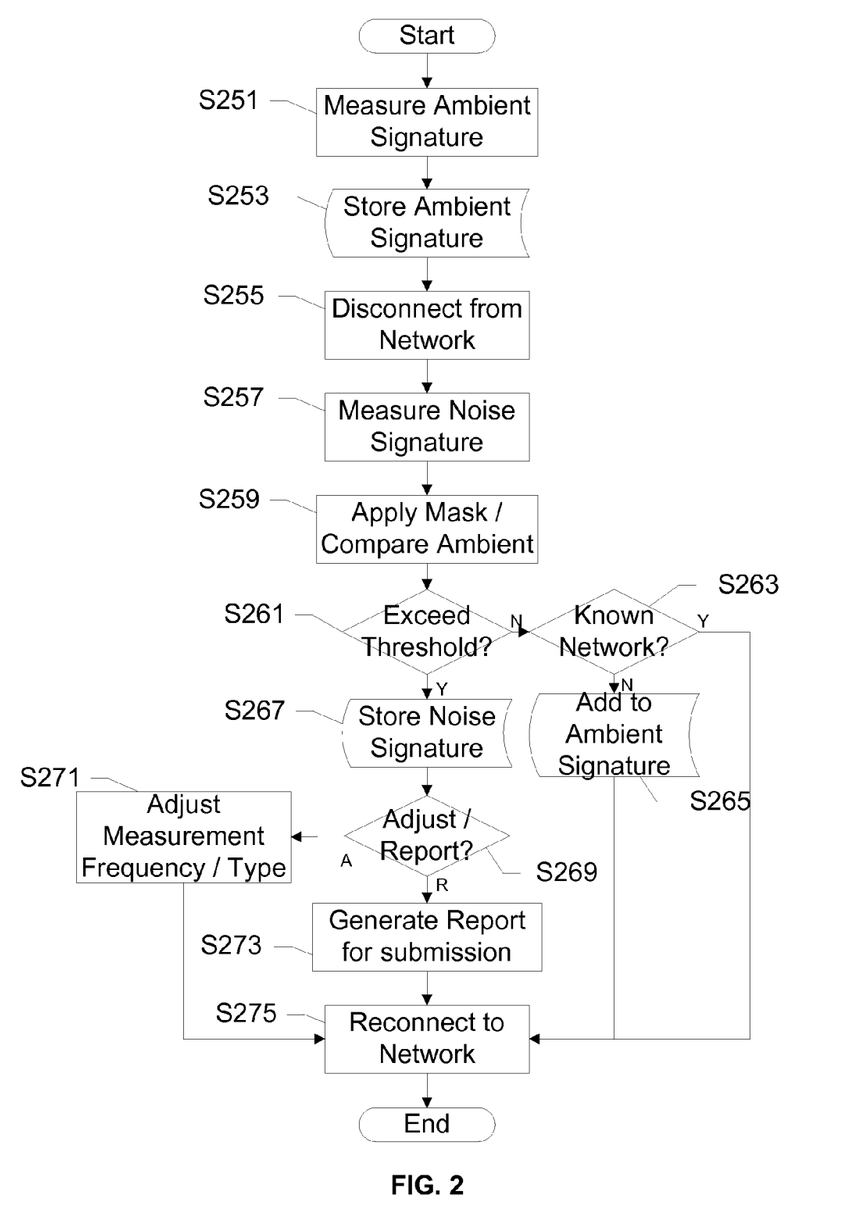
FIG. 2 shows a method for measuring noise, according to an exemplary embodiment of the present invention.

FIG. 2 shows a method for measuring noise, according to an exemplary embodiment of the present invention. At step S251, a wireless communication device embedded in a particular piece of equipment is initialized by measuring the ambient signature of the RF environment around the equipment. Ideally, the ambient signature measurement is performed when it is known that the device is in an optimally operational state, such that a benchmark or minimum threshold of quality can be defined. The threshold can be defined in terms of the signal strength of the primary provider's network, a noise floor, interference, or combinations thereof. Furthermore, any signatures of known third-party networks (such as other provider's networks) can be included within the ambient signature. These known signatures, also known as "masks", represent known sources of noise at a tolerable, i.e. ideal level. At step S253, the ambient signature, along with the thresholds, is stored for future reference. This can be considered a "training" process.

A noise signature measuring procedure is initiated at step S255 by disconnecting the wireless communication device from the provider's network. This step can be performed as per a set schedule, randomly, or by a prompt or command initiated remotely across the provider's network. Ideally, Step S255 is performed automatically by a management entity aboard the wireless communication device. At step S257, a noise signature is measured as described above. This is similar to the ambient signature measurement, except that it is performed automatically and potentially in a non-ideal RF environment. At step S259, a comparison of the noise signature is made against the ambient signature. This step includes applying any masks of known networks against the noise signature to remove or cancel out any noise effects of known networks. The masks themselves can have tolerances such that tolerable variations in the known network signal are cancelled out/ignored.

After comparing, step S261 determines whether any thresholds, either in the ambient signature or in the masks are exceeded. As described above, these thresholds include signal strength dropping below a certain point, or noise/interference levels rising above a certain point. If a threshold is not exceeded, then step S263 determines if there were any known networks in the noise signature based on the comparison to masks. If all tolerable noise is caused by known networks, then the wireless communication device reconnects to the provider's network S275, and the method ends. If there exists tolerable noise that is caused by an unknown network, or a new noise source, this new "mask" is added to the ambient signature in step S265, and the method ends S275. This addition of new masks of tolerable noise sources enables the device to constantly learn or be "trained" of new sources of noise in the environment, so that in the future these sources can be applied against subsequent noise signature measurements.

Getting back to step S261, if the noise threshold is exceeded, then the noise signature is stored S267 in a memory on the wireless communication device. At step S269 a remedial action to be taken is determined. Although step S269 shows a choice between adjusting a noise measurement and submitting a report, the two are not necessarily mutually exclusive and can both be performed. If adjustments need to be made, at step S271, the adjustments are performed. These adjustments include adjusting the frequency of measurement of the noise signature, for instance, by increasing the measurements at the particular time that the noise threshold was exceeded, or by performing more frequent measurements. This adjustment can be stored on a memory and provides future triggers to initiate step S255. Further, adjustments can include adjusting the type of measurement, for instance, by broadening the range of the RF band, narrowing the range, or by measuring particular frequencies. Moreover, adjustments can be performed synergistically, for instance—if a particular noise source of a known network exceeds a threshold around a specific time every day, then the adjustments would include measuring around the frequency band of the known network at the specific time in the future. Other adjustments will become apparent to one of ordinary skill in the art in light of this disclosure.

If a report is to be submitted, step S273 includes generating the report. The report includes at least the noise signature measured, any masks applied, time, date, any triggers associated with the measurement, and the results of the comparison with the ambient signature. Other details such as location, test equipment signatures, etc. can be reported. The report is either transmitted to a responsible party, such as an operator of the equipment, or to the provider of the network, for diagnostic purposes. Alternatively, the report can be stored on the device memory and accessed either directly or from a remote location across the network. The submission/retrieval of the report occurs, of course, after reconnecting to the network in step S275.

In alternative embodiments, diagnostics can be triggered remotely, even in the case that the transceiver does not have a strong link with the provider's network. So long as there is an existing downlink channel, a very minimal packet of data can be acknowledged, putting the device into a mode where the device makes either periodic or continuous noise signature measurements, and saves that information to memory. Locally accessing the stored reports is beneficial in this case. A technician could go out to the equipment and use a physical connection or a near-field technology, such as Bluetooth or Wi-Fi, to extract the report from the device. In alternative embodiments, where the link strength is very weak, a diagnostic can be triggered locally in order to command the device into a measurement mode.

Figure 3A:
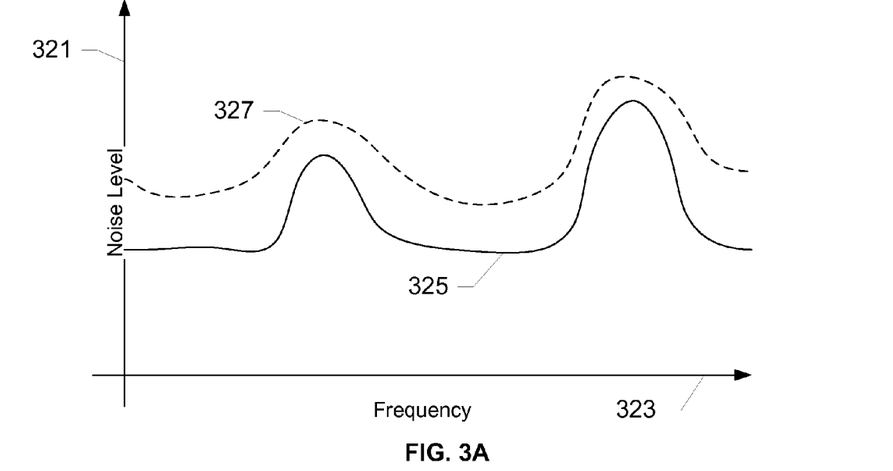
FIGS. 3A-3B respectively show ambient and noise signature measurements, according to an exemplary embodiment of the present invention.
Figure 3B:
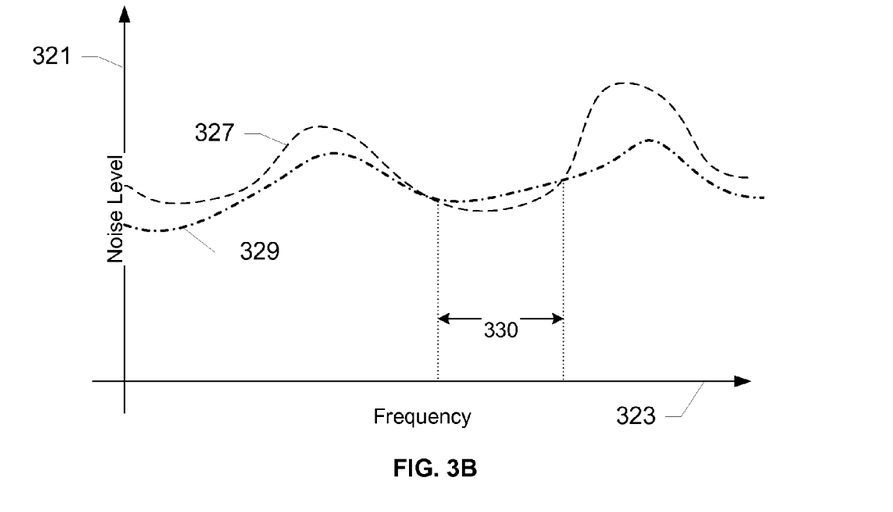

FIGS. 3A-3B respectively show ambient and noise signature measurements, according to an exemplary embodiment of the present invention. In FIG. 3A, X-axis 323 shows a spectrum or band of frequencies measured, and Y-axis 321 shows a noise level as a function of the frequency. Solid line 325 represents the level of noise measured with two peaks at two different frequencies. For instance, frequency band 323 could range from 500 MHz to 2000 MHz, with the peaks corresponding to two separate GSM networks. Dashed line 327 represents a maximum tolerance or threshold, as a function of noise floor 325. Conceivably, threshold 327 is a maximum level of noise that allows a decent communication link between the wireless communication device and a provider's network. The combination of noise floor 325 and threshold 327 is stored in the device memory as an ambient signature.

FIG. 3B shows a subsequent noise measurement, according to an exemplary embodiment of the present invention. The noise signature is represented by line 329. When compared to threshold 327, it is observed that for a portion 330 of the RF band between the peaks, the noise signature 329 exceeds the threshold 327. Depending on the RF range being used to communicate with the provider's network, this excess noise can trigger a host of remedial actions from simply re-taking measurements at that time of the day, to zooming in to range 330 for a more precise noise measurement, to generating an alarm.

Figure 4A:
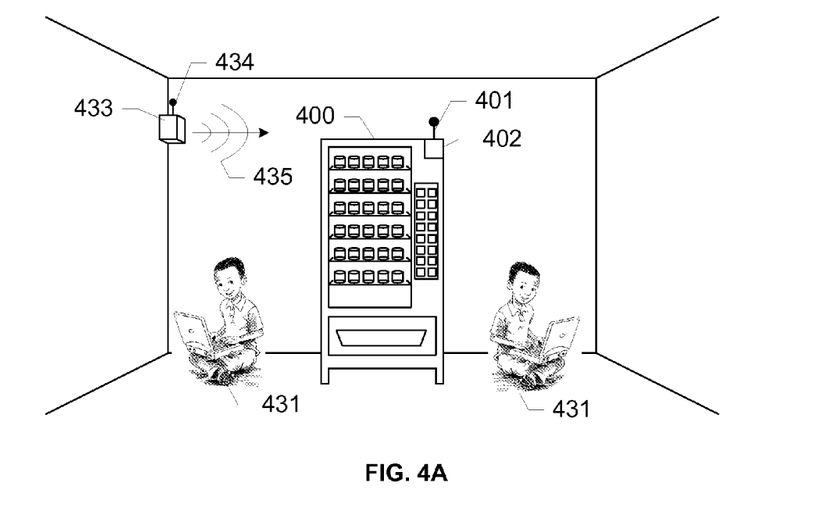
FIGS. 4A-4B show a noise signature measurement for a vending machine in a student lounge, according to an exemplary embodiment of the present invention.
Figure 4B:
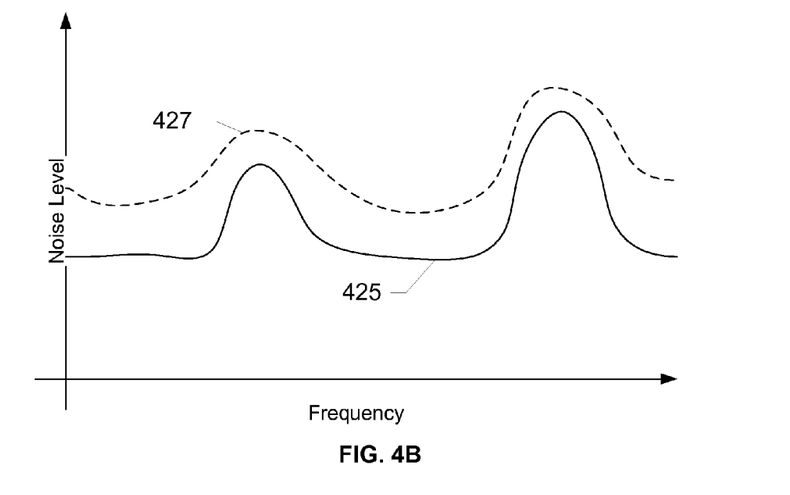

FIGS. 4A-4B show a noise signature measurement for a vending machine in a student lounge, according to an exemplary embodiment of the present invention. Referring to FIG. 4A, Vending machine 400 has an antenna 401 coupled to an embedded wireless communication device 402. In the same room are laptop users 431, the laptops having wireless radios that enable Wi-Fi communication with a wireless access point (WAP) 433. WAP 433 includes an antenna 434 that transmits and receives wireless signals 435. For the purposes of this embodiment, signals 435 will be termed third-party signals.

Vending machine 400 uses wireless communication device 402 to report its stock and other information back to a vendor or supplier of the snacks within vending machine 400. Occasionally, wireless communication device 402 is unable to communicate across the provider's network for any number of reasons. To determine the cause of these connectivity issues, the supplier has equipped embedded device 402 with a management module and/or a spectrum analyzer. When embedded device 402 was installed, an ambient signature measurement was performed, and stored along with a threshold. This is represented by threshold 427 in FIG. 4B. Further, the management module within embedded device 402 allows noise measurements to be taken at dynamically defined intervals, or based on triggers. The management module reports the results of these noise measurements to the supplier, vendor, or operator of the vending machine, so that a more effective diagnosis can be made of the connectivity issues.

For instance, as shown, two laptop users 431 are operating their Wi-Fi enabled laptop computers in the study lounge. The power requirement of antenna 434 is not very high, and therefore, third-party signal 435 does not generate an excessive amount of interference or noise. This can be seen in the graph of FIG. 4B. Noise signature 425 remains below threshold 427, and therefore, no remedial action needs to be taken. Although remedial actions such as storing the measurement and generating a report may be performed, the threshold remains un-exceeded, so there is no need for alarm.

Figure 5A:
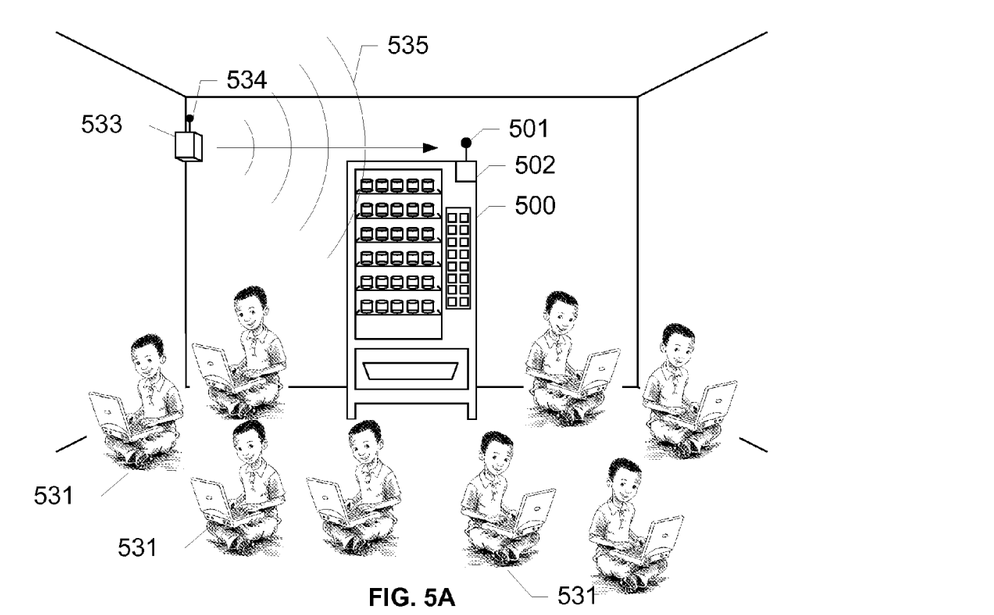
FIGS. 5A-5B show a noise signature measurement for a vending machine in a more crowded student lounge, according to an exemplary embodiment of the present invention.
Figure 5B:
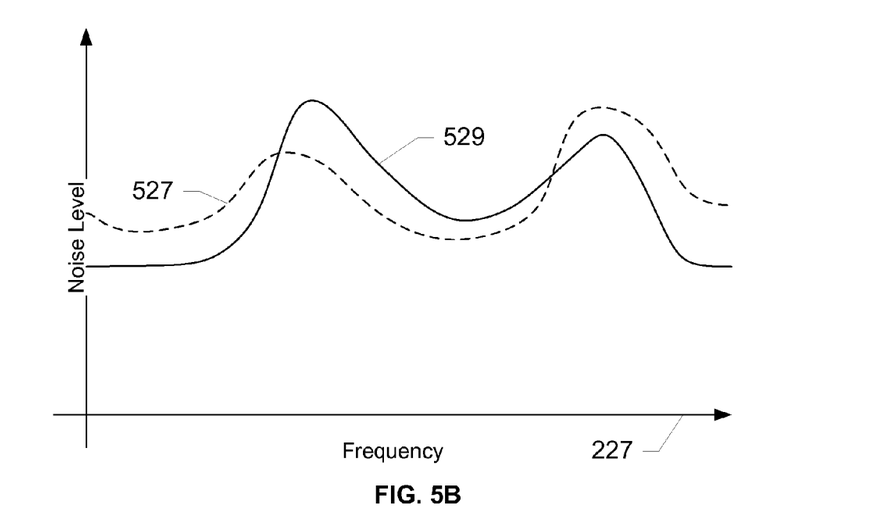

However, FIGS. 5A-5B tell a different story. The same student lounge includes vending machine 500 equipped with antenna 501 and wireless communication device 502, as well as WAP 533 having antenna 534. However, owing to the presence of several additional students 531, the power required to communicate with the several additional laptop users 531 increases the strength of the third-party signal 535. This increased signal strength causes more noise and interference within antenna 534, and reduces the quality of communication with the provider's network, causing connectivity issues.

Triggered by a pre-defined interval, an error in communication, or any other factor, embedded device 502 disconnects from the provider's network and initiates a noise signature measurement. The results of this measurement are shown in FIG. 5B. As seen in the graph, noise signature 529 is well above threshold 527 for a significant portion of the RF band. The comparison causes the management entity within embedded device 502 to perform one or more remedial actions, such as increasing a frequency of measurement at that particular time, further analyzing the affected portion of the RF band, generating and submitting a report, or generating an alarm. The report, as well as the frequency of measurement, can be based on a pattern determined by how often and at what time of day the interference increases, depending on when the number of laptop users in the room increases.

As described above, diagnostics can be triggered remotely or locally, and reports can be acquired in a similar fashion. Moreover, adjustments to the programming of the management unit can be performed via a user interface in communication with the wireless communication device either remotely or locally.

Figure 6:
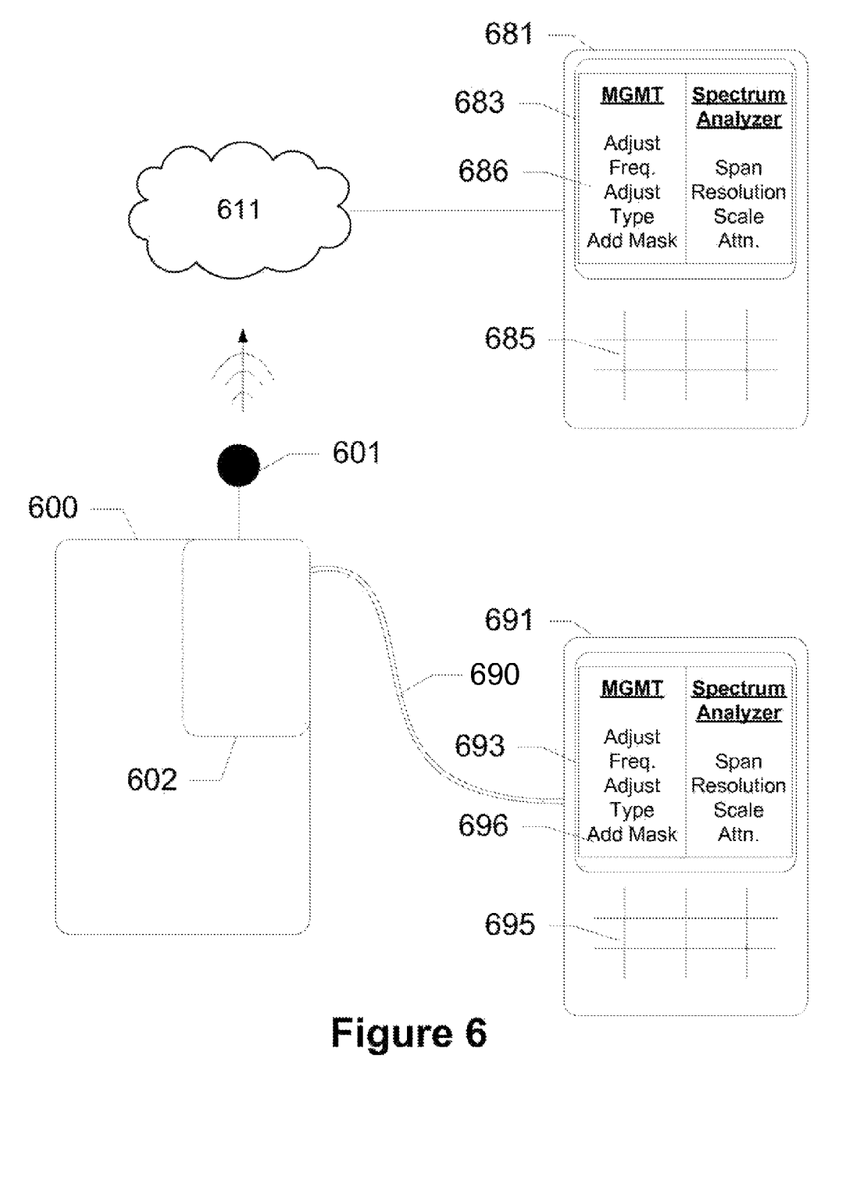
FIG. 6 shows a user interface on a remote and a local display, according to an exemplary embodiment of the present invention.

FIG. 6 shows a user interface on a remote and a local display, according to an exemplary embodiment of the present invention. Equipment 600 includes a wireless communication device 602 having an antenna 601. Antenna 601 enables communication with a provider's network 611. Also in communication with provider's network 611 is a remote entity 681 having at least a transceiver (not shown), a display 683 and an input device 685. Remote entity 681 can be a handheld computer, personal computer, terminal, or similar device. User interface 686 is shown on display 683 and enables a remote user to adjust measurement frequency, measurement type, and other features of both the management logic and the spectrum analyzer included within wireless communication device 602.

Further, in the case that antenna 601 does not have a strong link with provider's network 611, it is possible to locally access the user interface by using an interface cable 690 connected to local device 691. Local device 691 has similar components to remote device 681, except that it communicates with wireless communication device 602 using an interface cable 690. Although a cable is shown, it should be understood that any local interface can be used, wired or wireless, where wired includes at least USB, FireWire, serial, parallel, or similar interfaces, and wireless includes any near-field technology like Bluetooth or Wi-Fi. A technician uses device 691 to extract reports from wireless communication device 602, as well as to configure the management logic and spectrum analyzer within.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A device, comprising:
   a processor; and
   a memory storing logical instructions that, when executed by the processor, cause the processor to perform operations comprising:
      measuring a radio-frequency (RF) spectrum within a range of an antenna coupled to the processor, and
      comparing the RF spectrum with a known ambient RF spectrum to determine a noise level.

2. The device of claim 1, wherein the known ambient RF spectrum is obtained at a time that the device is known to be operating properly.

3. The device of claim 2, wherein the ambient RF spectrum includes a composite of ambient RF spectrums measured at different times.

4. The device of claim 1, wherein the RF spectrum includes a network signal and an interference measurement from an RF source.

5. The device of claim 4, wherein the RF source is one of a GSM, UMTS, LTE, COMA, WiFi, and WiMax network.

6. The device of claim 1, wherein the noise level includes any combination of: an error rate, an interference level, and an interference mask.

7. The device of claim 6, wherein the interference mask represents a known source of noise.

8. The device of claim 7, wherein the known source of noise is a signal from a third-party network.

9. The device of claim 1, wherein the operations further comprise adjusting a frequency of measurement, adjusting a type of measurement, reporting the noise level, generating an alarm, and changing an operating band to avoid interference.

10. The device of claim 1, wherein the operations further comprise de-registering from a network prior to measuring the RF spectrum.

11. The device of claim 1, wherein the operations further comprise presenting a user interface via a display in communication with the processor, the user interface displaying the noise level.

12. The device of claim 11, wherein the user interface enables an adjustment of a frequency and a type of noise signature measurement.

13. The device of claim 11, wherein the display is coupled to a remote device across a network in communication with the processor.

14. A method, comprising:
    utilizing a device including a processor for measuring a radiofrequency (RF) signal around an antenna coupled to the device, the RF signal including an interference level;
    comparing the noise signature with an ambient RF signal, the ambient RF signal representative of an environment where the device is known to be operating properly; and
    determining that a noise threshold is exceeded, the noise threshold including one of a signal strength of a provider's network, an error rate, an interference level, or an interference mask.

15. The method of claim 14, further comprising performing a remedial action.

16. The method of claim 15, wherein the remedial action comprises one or more of: adjusting a frequency of measurement, adjusting a type of measurement, generating an alert, and changing an operating band to avoid interference.

17. The method of claim 14, further comprising: de-registering from a network prior to measuring the RF signal.

18. The method of claim 14, further comprising displaying the RF measurement along with a plurality of user options on a user interface on a display coupled to the device.

19. A non-transitory computer readable medium storing computer-executable instructions that, when executed by a processor, cause the processor to perform operations comprising:
    measuring an ambient signature of a radio-frequency (RF) environment around an antenna coupled to the processor, the ambient signature including an interference signature for a known third-party network;
    storing the ambient signature;
    measuring a noise level;
    comparing the noise level with the ambient signature; and
    determining that a threshold is exceeded.

20. The non-transitory computer readable medium of claim 19, wherein the noise level is representative of another RF source, and wherein measuring the noise level includes comparing a measured interference level with the interference signature for the known third-party network.

* * * * *